United States Patent
Hu et al.

(10) Patent No.: US 11,097,491 B1
(45) Date of Patent: Aug. 24, 2021

(54) MASK-BASED PARTITION PREHEATING DEVICE AND PARTITION PREHEATING METHOD THEREOF

(71) Applicant: Kontour(Xi'an) Medical Technology Co., Ltd., Xi'an (CN)

(72) Inventors: Liren Hu, Xi'an (CN); Feng Zhao, Xi'an (CN); Chaoliang Jin, Xi'an (CN); Zhibin Wang, Xi'an (CN); Ruoyu Zhao, Xi'an (CN); Kai Tie, Xi'an (CN); Jingfeng Yang, Xi'an (CN); Yuan Li, Xi'an (CN); Dongdong Zhao, Xi'an (CN); Hua Xue, Xi'an (CN)

(73) Assignee: Kontour(Xi'an) Medical Technology Co., Ltd., Xi'an (CN)

( * ) Notice: Subject to any disclaimer, the term of this patent is extended or adjusted under 35 U.S.C. 154(b) by 0 days.

(21) Appl. No.: 16/968,153

(22) PCT Filed: Feb. 9, 2018

(86) PCT No.: PCT/CN2018/076087
§ 371 (c)(1),
(2) Date: Aug. 6, 2020

(87) PCT Pub. No.: WO2019/153287
PCT Pub. Date: Aug. 15, 2019

(30) Foreign Application Priority Data

Feb. 7, 2018 (CN) .......................... 201810124817.8

(51) Int. Cl.
*B29C 64/393* (2017.01)
*B29C 64/153* (2017.01)
(Continued)

(52) U.S. Cl.
CPC .......... *B29C 64/393* (2017.08); *B29C 64/153* (2017.08); *B29C 64/295* (2017.08);
(Continued)

(58) Field of Classification Search
CPC ... B29C 64/393; B29C 64/295; B29C 64/153; B33Y 40/10; B33Y 10/00; B33Y 50/02; B29K 2071/00
See application file for complete search history.

(56) References Cited

U.S. PATENT DOCUMENTS 10,843,415 B1 * 11/2020 Crane .................. B29C 64/277
2008/0262659 A1   10/2008 Huskamp
(Continued)

FOREIGN PATENT DOCUMENTS

CN    106564187 A    4/2017
CN    106738904 A    5/2017
(Continued)

*Primary Examiner* — Nahida Sultana
(74) *Attorney, Agent, or Firm* — Bayramoglu Law Offices LLC

(57) ABSTRACT

A mask-based partition preheating device and method are provided. The device includes an overall heating light source and a local preheating light source. A substrate provided at a forming cylinder is configured to heat an underlying powder. A mask plate is provided between the local preheating light source and the overall heating light source. A powder material to be sintered is coated on a local preheating zone. The local preheating light source, the mask plate and the overall heating light source are all connected to a temperature controller. A temperature control probe and a thermal imager in a temperature monitor are disposed in a working chamber for detecting the temperature of the powder surface.

10 Claims, 2 Drawing Sheets

(51) Int. Cl.
  *B29C 64/295* (2017.01)
  *B33Y 50/02* (2015.01)
  *B33Y 40/10* (2020.01)
  *B33Y 10/00* (2015.01)
  *B29K 71/00* (2006.01)

(52) U.S. Cl.
  CPC ............. *B33Y 10/00* (2014.12); *B33Y 40/10* (2020.01); *B33Y 50/02* (2014.12); *B29K 2071/00* (2013.01)

(56) References Cited

U.S. PATENT DOCUMENTS

| | | |
|---|---|---|
| 2014/0348692 A1 | 11/2014 | Bessac et al. |
| 2015/0132173 A1 | 5/2015 | Bruck et al. |
| 2016/0297006 A1 | 10/2016 | Buller et al. |
| 2019/0033719 A1* | 1/2019 | Cole .......................... C08F 2/44 |
| 2020/0362142 A1* | 11/2020 | Saito ......................... C08K 5/17 |

FOREIGN PATENT DOCUMENTS

| | | | |
|---|---|---|---|
| CN | 107000321 | A | 8/2017 |
| CN | 107379527 | A | 11/2017 |
| EP | 3196001 | A1 | 7/2017 |

\* cited by examiner

MASK-BASED PARTITION PREHEATING DEVICE AND PARTITION PREHEATING METHOD THEREOF

CROSS REFERENCE TO THE RELATED APPLICATIONS

This application is the national phase entry of International Application No. PCT/CN2018/076087, filed on Feb. 9, 2018, which is based upon and claims priority to Chinese Patent Application No. 201810124817.8, filed on Feb. 7, 2018, the entire contents of which are incorporated herein by reference.

TECHNICAL FIELD

The present invention pertains to the technical field of additive manufacturing devices, and more particularly, to a mask-based partition preheating device and a partition preheating method thereof.

BACKGROUND

Selective laser sintering (SLS) technology is a rapid prototyping technology that uses a laser as an energy source to sinter powder materials layer by layer into three-dimensional articles. Polymers, metals, ceramics and other materials can be used in SLS. In order to reduce deformation and warpage and increase laser utilization, when polymer materials are used in SLS, the material in the powder bed is generally preheated to a temperature slightly lower than the melting point of the material, which is the preheating temperature. The preheating temperature is an important parameter that affects the accuracy and performance of the components. When the preheating temperature is low, warpage will occur during the prototyping process, the components will be deformed, and the accuracy of the articles formed will decrease or they become difficult to form.

When the preheating temperature is excessively high, the unsintered powder is hardened due to adhesion and cannot be recycled and reused. This significantly increases printing cost. Especially for some special engineering plastics or aging materials with higher melting points (melting point 300° C.), such as polyether ether ketone (PEEK), polyimide (PI) and the like, the preheating temperature is high (300° C.) and the preheating range is narrow. On the one hand, bearings, slide rails and other components in the forming cavity are in a high-temperature environment for a long time, and the aging speed is accelerated, so that the continuous working time and long-term stability of the forming machine are greatly reduced. On the other hand, since the material cost of such high-melting-point polymers are often double or several times that of low melting point materials such as nylon and wax powder, if the unsintered powder is hardened during the forming process and is difficult to reuse, the production cost will increase significantly.

SUMMARY

The technical problem to be solved by the present invention is to provide a mask-based partition preheating device and a partition preheating method thereof. By reducing the overall working temperature of the forming cavity and reducing the cooling pressure of the equipment, the working stability and continuous working time of the SLS forming equipment are increased, and maintenance cost of the equipment is reduced.

In order to solve the above problems, a mask-based partition preheating device is provided, including a forming cylinder arranged at a bottom. A heating substrate is provided at a bottom of the forming cylinder for heating an underlying powder material. A local preheating zone is provided according to a cross-sectional profile of a component to be processed. A powder material to be sintered is coated on the local preheating zone by a powder feeding mechanism, and the powder material is accumulated in the forming cylinder to form a powder bed.

An overall heating light source is provided above the forming cylinder, and a local preheating light source is provided above the overall heating light source. A mask plate is provided between the local preheating light source and the overall heating light source. A shape of the mask plate corresponds to the cross-sectional shape of the component, and the mask plate is arranged above the component.

The local preheating light source, the mask plate and the overall heating light source are connected to a temperature controller, and the temperature controller is connected to a temperature monitor. A temperature control probe and a thermal imager are provided in the temperature monitor, and the temperature control probe and the thermal imager are arranged at a position corresponding to the local preheating zone.

As a preferred solution, a nitrogen filling device is provided in the forming cylinder, and the nitrogen filling device includes a nitrogen nozzle connected to a nitrogen bottle. A nitrogen valve is arranged on the nitrogen bottle, and a barometer is arranged on the nitrogen nozzle.

As a preferred solution, the temperature controller sets an overall preheating temperature and a local preheating temperature within a range of 20° C.-120° C. and 1-50° C. below a melting point of a material separately, and the temperature controller sets a temperature of the substrate in the forming cylinder and a temperature of four walls of the forming cylinder within a range of the melting point of the material from 20° C. to 150° C. and from 20° C. to 200° C. separately.

As a preferred solution, a layered structure is provided at the low part of the mask plate. The layered structure includes a heat reflection layer, a first heat dissipation layer, a second heat dissipation layer, a heat insulation layer, a third heat dissipation layer and a fixed layer each of which are arranged successively from top to bottom.

As a preferred solution, a plurality of first strip holes are transversely arranged in the middle of the first heat dissipation layer. The second heat dissipation layer is provided with a plurality of longitudinal holes communicating with the strip holes, and a bottom of the longitudinal hole is closed. The third heat dissipation layer is provided with a plurality of second strip holes, and the second strip holes are closed holes and filled with air.

The present invention further provides a partition preheating method of the mask-based partition preheating device, including the following steps:

step (1), performing geometric slicing and layering on the component to be formed to obtain a cross-sectional profile and a scanning path of each layer of the component to be formed;

step (2), using the nitrogen filling device arranged in the forming cylinder to fill a forming cavity with nitrogen for a nitrogen protection step;

step (3), using a powder feeding and spreading device to spread the powder on the powder material to form a uniform and smooth powder surface structure to be scanned;

step (4), setting the overall preheating temperature and the local preheating temperature within the range of 20° C.-120° C. and 1-50° C. below the melting point of the material separately by the temperature controller, and setting the temperature of the substrate in the forming cylinder and the temperature of four walls of the forming cylinder within the range of the melting point of the material from 20° C. to 150° C. and from 20° C. to 200° C. separately;

step (5), forming a corresponding mask by the mask plate according to a cross-sectional profile to be scanned and a scanned cross-sectional profile of the component, and thermoforming local powder to be scanned when the heat of the local preheating light source reaches a preheating zone of a cross-sectional surface of the forming component;

step (6), using the temperature monitor to monitor temperature in real time, and when the overall preheating temperature and the local preheating temperature are reached, respectively, using a laser scanner to scan the cross-sectional profile of the component to complete a sintering of a current layer of powder;

step (7), reducing the substrate by one-layer thickness, and spreading a new layer of powder, reconfirming the overall/local preheating temperature and a change of an overall temperature field in real time by the temperature monitor. If a sudden temperature change occurs in a sintered zone and an un-sintered zone, adjusting a profile of the mask plate and power of the local preheating light source by the temperature controller to cause a uniform transition of the temperature field between the sintered zone and the un-sintered zone, and then scanning the cross-sectional profile of the layer again by the laser scanner;

step (8), repeating steps (5) to (7) until completing sintering of all cross-sectional profiles of the component;

step (9), slowly reducing power of the overall preheating light source and power of the local preheating light source based on material characteristics of the powder, so that a sintered component and un-sintered powder are slowly cooled to ensure the stability of the shape and size of the component; and step (10), taking out the formed component, and recovering and sieving the un-sintered powder for reuse.

Compared with the prior art, the present invention has the following advantages.

(1) The present invention reduces the overall working temperature of the forming cavity, reduces the cooling pressure of the equipment, increases the machine's working stability and continuous working time and reduces equipment maintenance cost.

(2) The present invention reduces the heating temperature of the non-sintering zone, while ensuring the dimensional accuracy of the component. It significantly reduces the aging and hardening of the materials in the zone, so that high-melting-point polymers can be recycled and the utilization rate of the powder is increased.

In the figures: 1—local preheating light source; 2—mask plate; a1—heat reflection layer; a2—first heat dissipation layer; a3—second heat dissipation layer; a4—heat insulation layer; a5—third heat dissipation layer; a6—fixed layer; b1—first strip hole; b2—longitudinal hole; b3—second strip hole; 3—temperature controller; 4—temperature monitor; 5—powder material; 6—component; 7—overall heating light source; 8—temperature control probe; 9—thermal imager; 10—substrate heating plate; 11—forming cylinder; 12—local preheating zone.

DETAILED DESCRIPTION OF THE EMBODIMENTS

Specific embodiments of the present invention will be described below in detail with reference to the drawings.

Embodiment 1

Figure 1:
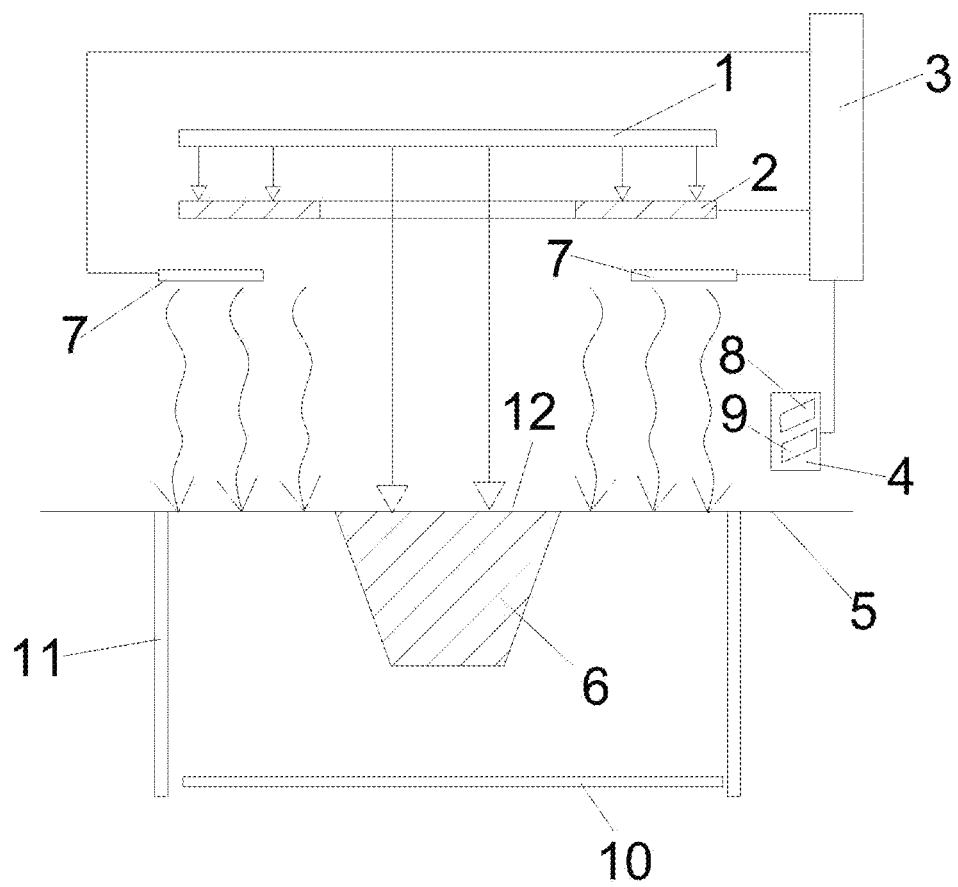
FIG. 1 is a front view of a mask-based partition preheating device of the present invention.

As shown in FIG. 1, a mask-based partition preheating device includes a forming cylinder 11 arranged at a bottom. The heating substrate 10 is provided at a bottom of the forming cylinder 11 for heating an underlying powder material. The local preheating zone 12 is provided according to a cross-sectional profile of the component 6 to be processed. The powder material 5 to be sintered is coated on the local preheating zone 12 by a powder feeding mechanism, and the powder material 5 is accumulated in the forming cylinder 11 to form a powder bed. In an embodiment, the high melting point series polymer HP3 PEEK powder introduced by the German EOS company is taken as an example for detailed description. Specifically, the melting point of HP3 PEEK powder is 372° C.

When the prior traditional overall single preheating method is used, the powder surface preheating temperature is 365° C. The temperature of the forming substrate is 340° C., and the temperature of four walls of the forming cylinder 11 is 345° C. After the forming, all of the un-sintered powder collected in the forming cylinder 11 will be hardened and cannot be reused.

The invention solves this problem. The overall heating light source 7 is provided above the forming cylinder 11, and the local preheating light source 1 is provided above the overall heating light source 7. The mask plate 2 is provided between the local preheating light source 1 and the overall heating light source 7. A shape of the mask plate 2 correspond to the cross-sectional shape of the component 6, and the mask plate 2 is arranged above the component 6.

The local preheating light source 1, the mask plate 2 and the overall heating light source 7 are connected to the temperature controller 3. The temperature controller 3 is connected to the temperature monitor 4. The temperature control probe 8 and the thermal imager 9 are provided in the temperature monitor 4. In one embodiment, the thermal imager 9 is an infrared thermal imager. The temperature control probe 8 and the thermal imager 9 are arranged in the forming cavity for monitoring the overall and local preheating temperatures.

Preferably, a nitrogen filling device is provided in the forming cylinder 11, and the nitrogen filling device includes a nitrogen nozzle connected to a nitrogen bottle. A nitrogen valve is arranged on the nitrogen bottle, and a barometer is arranged on the nitrogen nozzle for nitrogen protection.

Preferably, the temperature controller 3 sets the overall preheating temperature and the local preheating temperature within a range of 20° C.-120° C. and 1-50° C. below a melting point of a material separately, and sets the temperature of the substrate 10 in the forming cylinder 11 and a temperature of four walls of the forming cylinder 11 within a range of the melting point of the material from 20° C. to 150° C. and from 20° C. to 200° C. separately.

The present invention further provides a partition preheating method of the mask-based partition preheating device, including the following steps.

Step (1): geometric slicing and layering are performed on the component 6 to be formed to obtain a cross-sectional profile and a scanning path of each layer of the component 6 to be formed.

Step (2): a nitrogen filling device arranged in the forming cylinder is adopted to fill a forming cavity with nitrogen for a nitrogen protection step.

Step (3): a powder feeding and spreading device is adopted to spread the powder on the powder material 5 to form a uniform and smooth powder surface structure to be scanned.

Step (4): the temperature controller 3 sets the overall preheating temperature and the local preheating temperature within the range of 20° C.-120° C. and 1-50° C. below the melting point of the material separately, and sets the temperature of the substrate 10 in the forming cylinder 11 and the temperature of four walls of the forming cylinder 11 within the range of the melting point of the material from 20° C. to 150° C. and from 20° C. to 200° C. separately.

Step (5): the mask plate 2 forms a corresponding mask according to a cross-sectional profile to be scanned and a scanned cross-sectional profile of the component 6, and local powder to be scanned is thermoformed when the heat of the local preheating light source reaches a preheating zone of a cross-sectional surface of the forming component 6.

Step (6): the temperature monitor 4 is adopted to monitor temperature in real time, and when the overall preheating temperature and the local preheating temperature are reached, respectively, a laser scanner is adopted to scan the cross-sectional profile of the component 6 to complete a sintering of a current layer of powder.

Step (7): the substrate 10 is reduced by one-layer thickness, and a new layer of powder material is spread. The temperature monitor 4 reconfirms the overall/local preheating temperature and a change of an overall temperature field in real time. If a sudden temperature change occurs in a sintered zone and an un-sintered zone, the temperature controller 3 adjusts a profile of the mask plate 2 and power of the local preheating light source to cause a uniform transition of the temperature field between the sintered zone and the un-sintered zone, and then the laser scanner scans the cross-sectional profile of the layer again.

Step (8): steps (5) to (7) are repeated until sintering of all cross-sectional profiles of the component 6 is completed.

Step (9): power of the overall preheating light source and power of the local preheating light source are slowly reduced based on material characteristics of the powder material 5, so that the sintered component 6 and the un-sintered powder are slowly cooled to ensure the stability of the shape and size of the component 6.

Step (10): the formed component 6 is taken out, and the un-sintered powder is recovered and sieved for reuse.

Preferably, the powder material (5) in the step (7) is reduced by one-layer thickness, and the thickness of the reduced layer thickness ranges from 0.10 to 0.14 mm, and then a new layer of powder material is coated.

Preferably, in step (7), the thickness of the reduced layer thickness is 0.10 mm, 0.11 mm, 0.12 mm, 0.13 mm or 0.14 mm, and then a new layer of powder material is coated. According to the different structures of different components 6 in the present invention, different thicknesses can be selected to reduce, and the sintering of components 6 can be better realized. The high melting point polymer used in the present invention is locally preheated. In the embodiment, HP3 powder sintering material is selected, so as to improve the problem that the powder cannot be reused due to agglomeration of unprinted powder in the existing high melting point polymer.

Embodiment 2

Figure 2:
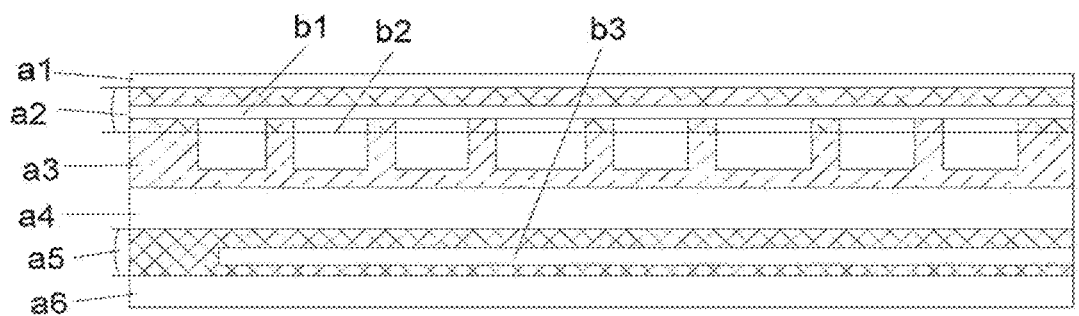
FIG. 2 is an enlarged front view of the structure of the mask plate in FIG. 1.

As shown in FIG. 2, the present embodiment further improves the technical solution on the basis of Embodiment 1, the differences lie in that: in the present embodiment, a layered structure is arranged at the lower part of the mask plate 2, and the layered structure includes the heat reflection layer a1, the first heat dissipation layer a2, the second heat dissipation layer a3, the heat insulation layer a4, the third heat dissipation layer a5 and the fixed layer a6, which are arranged successively from top to bottom. Among them, the heat reflection layer a1 is made of high-finish materials, such as stainless steel with a polished surface. The fixed layer a6 is made of hard ceramic material, the bottom surface of which is made of heat-resistant resin and then bonded with the top plate 10 of the forming cylinder. Preferably, the heat insulation layer a4 is made of asbestos material, which plays a role of heat insulation and heat resistance. The first heat dissipation layer a2 is made of ceramic material of coarse-grained sand. A plurality of first strip holes b1 are transversely arranged in the middle of the first heat dissipation layer a2. The two ends of the first strip hole b1 penetrate the first heat dissipation layer a2, so that the heat not reflected by the heat reflection layer a1, that is, the absorbed heat, can be smoothly dissipated from the two ends of the first strip hole b1. The second heat dissipation layer a3 is provided with a plurality of longitudinal holes b2 communicating with the first strip holes b1. A bottom of the longitudinal hole b2 is closed to form an air cavity communicating with the first strip hole b1, which plays a role of smooth heat dissipation. The third heat dissipation layer a5 is provided with a plurality of second strip holes b3, and the second strip holes b3 are closed holes and filled with air. Due to the property of non-conducting heat, the air can play the role of heat preservation and maintain the required temperature on the forming cylinder 11, that is, the local preheating zone 12 can be preheated.

The preferred specific embodiments and examples of the present invention are described in detail above in conjunction with the drawings, but the present invention is not limited to the above-mentioned embodiments and examples, and within the scope of knowledge possessed by those skilled in the art, various changes are made under the premise of the inventive concept.

What is claimed is:
1. A mask-based partition preheating device, comprising a forming cylinder arranged at a bottom, wherein, a substrate is provided at a bottom of the forming cylinder for heating underlying powder; a local preheating zone is provided at a cross-sectional position according to a cross-sectional shape of a component; a powder material to be sintered is coated on the local preheating zone by a powder feeding mechanism, and the powder material is accumulated in the forming cylinder to form a powder bed;
   an overall heating light source is arranged above the forming cylinder, and a local preheating light source is arranged above the overall heating light source; a mask plate is provided between the local preheating light source and the overall heating light source; a shape of the mask plate corresponds to the cross-sectional shape of the component, and the mask plate is arranged above the component; and the local preheating light source, the mask plate and the overall heating light source are connected to a temperature controller, and the temperature controller is connected to a temperature monitor; a temperature control probe and a thermal imager are provided in the temperature monitor, and the temperature control probe and the thermal imager are arranged in a working chamber for detecting a temperature of a powder surface.

2. The mask-based partition preheating device according to claim 1, wherein, a nitrogen filling device is provided in the forming cylinder, and the nitrogen filling device comprises a nitrogen nozzle connected to a nitrogen bottle; a nitrogen valve is arranged on the nitrogen bottle, and a barometer is arranged on the nitrogen nozzle.

3. The mask-based partition preheating device according to claim 1, wherein, the temperature controller sets an overall preheating temperature and a local preheating temperature within a range of 20° C.-120° C. and 1-50° C. below a melting point of a material separately, and the temperature controller sets a temperature of the substrate in the forming cylinder and a temperature of four walls of the forming cylinder within a range of the melting point of the material from 20° C. to 150° C. and from 20° C. to 200° C. separately.

4. The mask-based partition preheating device according to claim 1, wherein, a layered structure is provided at a low part of the mask plate, and the layered structure comprises a heat reflection layer, a first heat dissipation layer, a second heat dissipation layer, a heat insulation layer, a third heat dissipation layer and a fixed layer successively arranged from top to bottom.

5. The mask-based partition preheating device according to claim 4, wherein, a plurality of first strip holes are transversely arranged in a middle of the first heat dissipation layer; the second heat dissipation layer is provided with a plurality of longitudinal holes communicating with the plurality of first strip holes, and a bottom of the plurality of longitudinal hole is closed; the third heat dissipation layer is provided with a plurality of second strip holes, and the plurality of second strip holes are closed holes and filled with air.

6. A partition preheating method of the mask-based partition preheating device according to claim 1, comprising the following steps:

step (1), performing geometric slicing and layering on the component to be formed to obtain a cross-sectional profile and a scanning path of each layer of the component to be formed;

step (2), using the nitrogen filling device arranged in the forming cylinder to fill a forming cavity with nitrogen for a nitrogen protection step;

step (3), using a powder feeding mechanism to spread the powder on the powder material to form a uniform and smooth powder surface structure to be scanned;

step (4), setting the overall preheating temperature and the local preheating temperature within the range of 20° C.-120° C. and 1-50° C. below the melting point of the material separately by the temperature controller, and setting a temperature of the substrate in the forming cylinder and a temperature of four walls of the forming cylinder within the range of the melting point of the material from 20° C. to 150° C. and from 20° C. to 200° C. separately;

step (5), forming a corresponding mask by the mask plate according to a cross-sectional profile to be scanned and a scanned cross-sectional profile of the component, and thermoforming local powder to be scanned when heat of the local preheating light source reaches a preheating zone of a cross-sectional surface of the component;

step (6), using the temperature monitor to monitor temperature of the forming cylinder in real time, and when the overall preheating temperature and the local preheating temperature are reached, using a laser scanner to scan the cross-sectional profile of the component to complete a sintering of a current layer of powder;

step (7), reducing the substrate by one-layer thickness, and spreading a new layer of powder, reconfirming the overall/local preheating temperature and a change of an overall temperature field in real time by the temperature monitor; if a sudden temperature change occurs in a sintered zone and an un-sintered zone, adjusting a profile of the mask plate and power of the local preheating light source by the temperature controller to cause a uniformly transition of the temperature field between the sintered zone and an un-sintered zone, and then scanning the cross-sectional profile of the current layer again by the laser scanner;

step (8), repeating steps (5) to (7) until completing sintering of all cross-sectional profiles of the component;

step (9), slowly reducing power of the overall preheating light source and the power of the local preheating light source based on material characteristics of the powder material, wherein, a sintered component and un-sintered powder are slowly cooled to ensure stability of a shape and a size of the component; and step (10), taking out the sintered component, recovering and sieving the un-sintered powder for reuse.

7. The partition preheating method according to claim 6, wherein, a nitrogen filling device is provided in the forming cylinder, and the nitrogen filling device comprises a nitrogen nozzle connected to a nitrogen bottle; a nitrogen valve is arranged on the nitrogen bottle, and a barometer is arranged on the nitrogen nozzle.

8. The partition preheating method according to claim 6, wherein, the temperature controller sets an overall preheating temperature and a local preheating temperature within a range of 20° C.-120° C. and 1-50° C. below a melting point of a material separately, and the temperature controller sets a temperature of the substrate in the forming cylinder and a temperature of four walls of the forming cylinder within a range of the melting point of the material from 20° C. to 150° C. and from 20° C. to 200° C. separately.

9. The partition preheating method according to claim 6, wherein, a layered structure is provided at a low part of the mask plate, and the layered structure comprises a heat reflection layer, a first heat dissipation layer, a second heat dissipation layer, a heat insulation layer, a third heat dissipation layer and a fixed layer successively arranged from top to bottom.

10. The partition preheating method according to claim 9, wherein, a plurality of first strip holes are transversely arranged in a middle of the first heat dissipation layer; the second heat dissipation layer is provided with a plurality of longitudinal holes communicating with the plurality of first strip holes, and a bottom of the plurality of longitudinal hole is closed; the third heat dissipation layer is provided with a plurality of second strip holes, and the plurality of second strip holes are closed holes and filled with air.

* * * * *